July 12, 1966
J. T. MAYHEW
3,260,577
COATED PRODUCT AND ITS MANUFACTURE
Filed Dec. 20, 1961
2 Sheets-Sheet 1
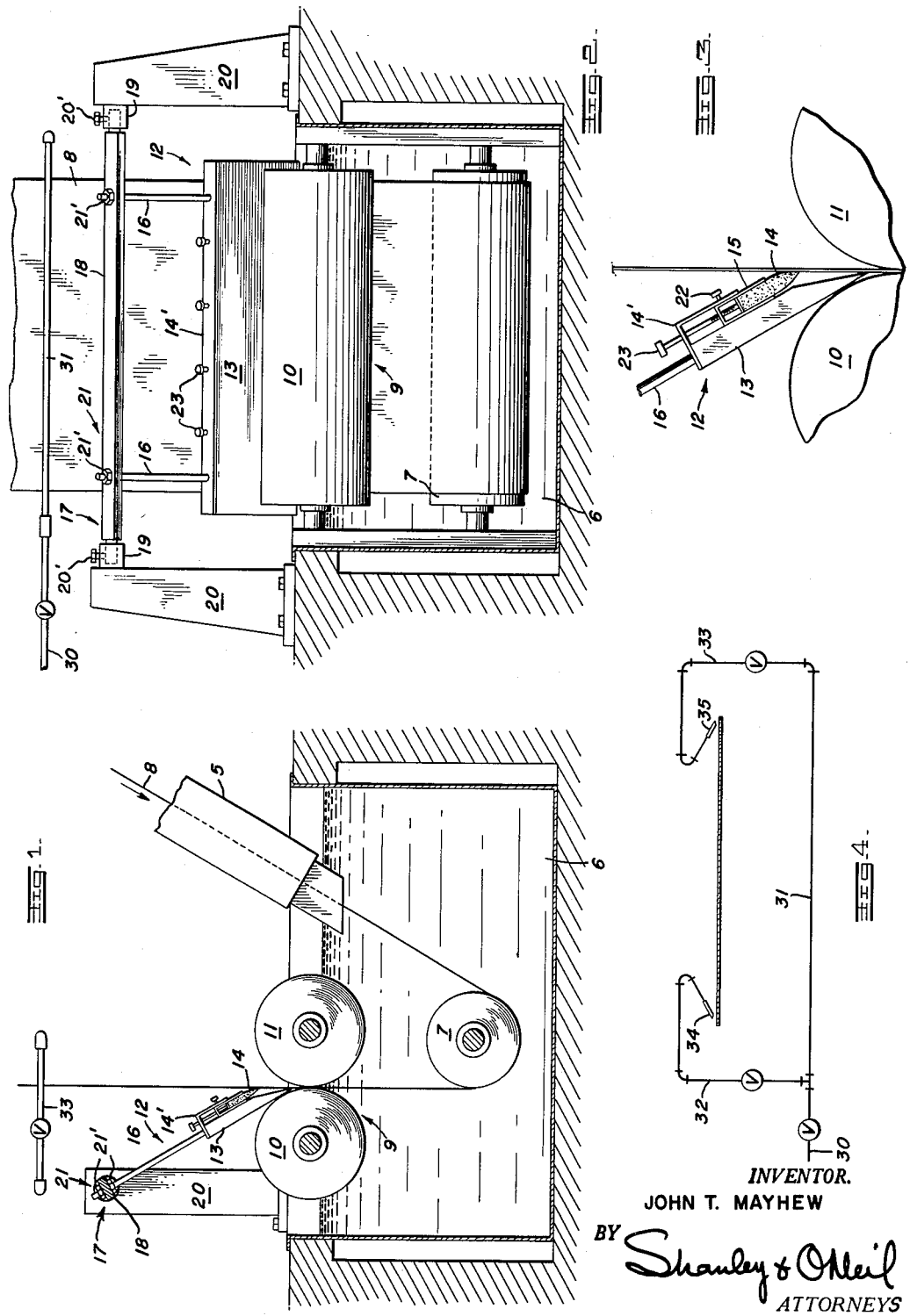
INVENTOR.
JOHN T. MAYHEW
BY Shanley & O'Neil
ATTORNEYS

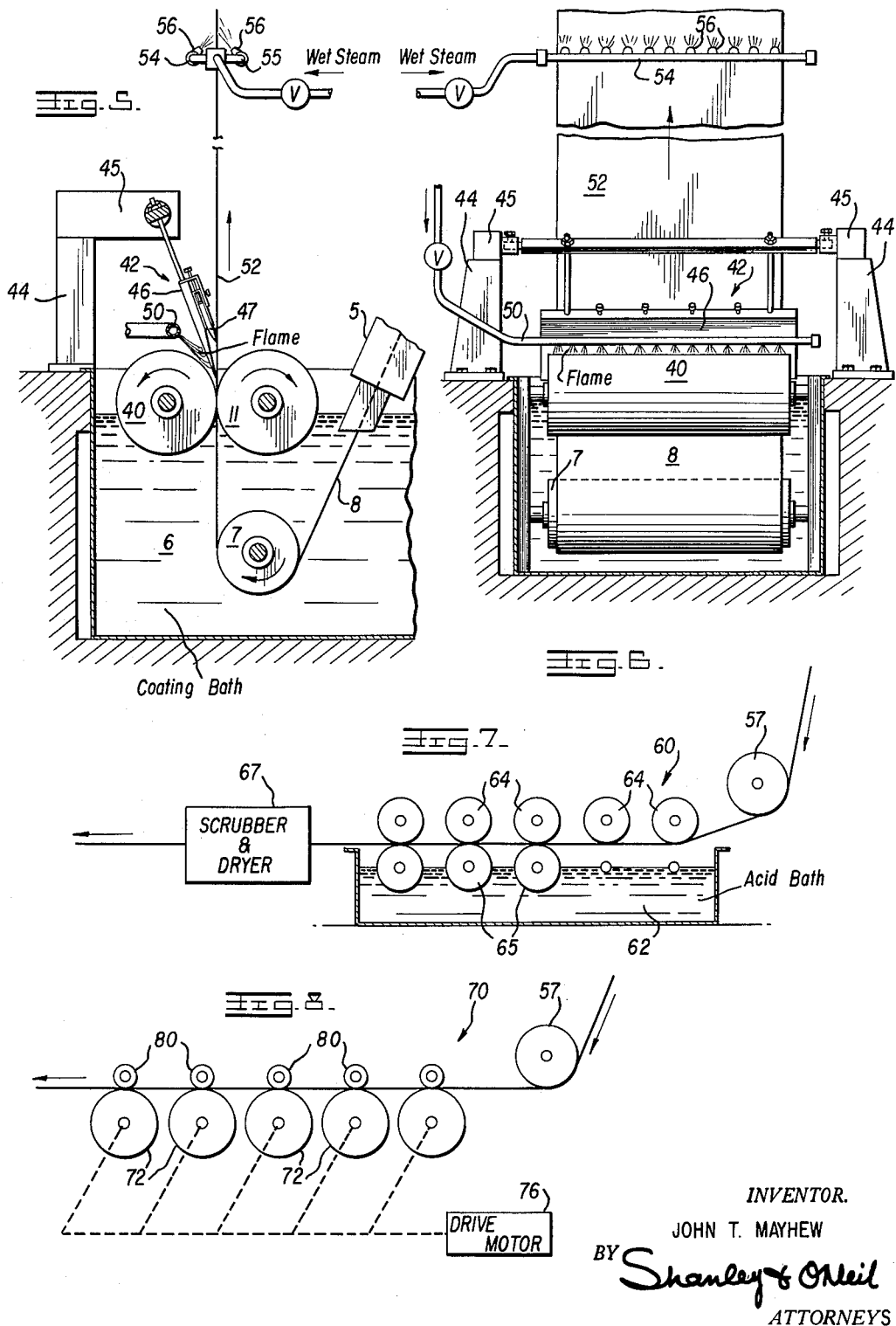

United States Patent Office 3,260,577
Patented July 12, 1966

3,260,577
COATED PRODUCT AND ITS MANUFACTURE
John T. Mayhew, Toronto, Ohio, assignor to National Steel Corporation, a corporation of Delaware
Filed Dec. 20, 1961, Ser. No. 163,956
16 Claims. (Cl. 29—183.5)

This application is a continuation-in-part of applicant's copending application Serial No. 842,802, filed September 28, 1959, for "Coated Product and Its Manufacture," and now abandoned.

This invention relates to a new, dip-coated flat-rolled product especially suitable for certain industrial applications, and to methods and apparatus for producing such a product.

In the steel industry, protective coating of flat-rolled products has been practiced since the origin of such products. The effectiveness of protective coatings, such as zinc, aluminum, lead, tin and mixtures of metals, depends upon the character of the environment in which they are to be used and the thickness of the coating. Galvanized flat-rolled products find considerable application where the character of the environment varies greatly on opposite surfaces of the product. In building sidings and roofs, the exterior must withstand greater weathering than the interior, and in automobiles, portions of numerous elements are inaccessible and must withstand corrosive ambient conditions without benefit of the painting or waxing, etc., afforded to accessible surfaces. These and various other similar applications of flat-rolled products create a need for a product having a relatively heavy coating on one surface and a relatively light coating on the opposite surface. The economies of such a product are obvious. Both the need and the economy have been recognized for years. During this period hot-dip products, such as galvanized strip and tinplate, have been continuously produced with coatings of equal thickness on both sides of the product. In effect, the uniform coat has become an inherent characteristic of the hot-dip, flat-rolled product. In departing from these limitations, a primary object of the invention is to provide a differential coat, flat-rolled hot-dip product.

A further object of the invention is to provide methods and apparatus for reducing the amount of coating on one surface of a hot-dip, flat-rolled product.

An additional object of the invention is the provision of methods and apparatus which reduce the amount of coating on one surface of a flat-rolled product without disturbing the coating on the opposite surface of the product.

In certain applications of galvanized flat-rolled product it is desirable to have one surface of the product coated and the remaining surface galvanize coating-free. Such a product finds particular usage where one surface is exposed to corrosive action or is not readily accessible to prevent corrosion and the remaining surface is exposed to view and is required to blend with other, adjacent, noncoated product. Automobile fenders or door panels are a typical application. Here the interior surface is relatively unaccessible and must withstand corrosive influences whereas the exterior surface is painted to blend with the remainder of the car. If any galvanize coating is present on the exterior surfaces of a product in this application, it is difficult to cover the coated surface so that its color and texture will match adjacent uncoated steel surfaces. One of the main objects of the invention is the production of flat-rolled metal product which is fully coated on only one surface: included in this object are methods and apparatus for producing such a product in a continuous strip hot-dip operation.

In the accompanying drawings:

FIGURE 1 is a side elevation with parts in section of apparatus embodying the invention;

FIGURE 2 is a front elevation with parts in section of apparatus illustrated in FIGURE 1;

FIGURE 3 is an enlarged view of a portion of FIGURE 1;

FIGURE 4 is a diagrammatic sketch of edge control means useful in conjunction with the apparatus of FIGURES 1 and 2.

FIGURE 5 is a side elevation with parts in section of apparatus embodying the invention;

FIGURE 6 is a front elevation with parts in section of apparatus embodying the invention;

FIGURE 7 is a schematic diagram of apparatus for carrying out a method invention; and FIGURE 8 is a schematic diagram of other apparatus for carrying out a variant of a method of the invention.

The invention is especially suitable for, though in no way limited to, use with continuous strip, hot-dip, galvanizing apparatus and will be described in this environment. In continuous galvanizing lines, a continuous steel strip is led into a galvanizing pot which contains molten zinc at a temperature of about 875° F., passes around a submerged roll, and exits through coating thickness control means at or above the surface of the bath which leave a uniform coating on both surfaces of the strip. The present invention achieves a differential coat by reducing the molten coating on one surface of the strip. Numerous obstacles to reducing the coating on one surface of the strip will become apparent to those having a knowledge of modern continuous strip hot-dip galvanizing lines. Other obstacles are less apparent; for example traveling strip tends to form buckles and sways and to take on diverse curvilinear configurations which would cause spotty, uneven coating removal. A significant feature of the invention involves utilization of a configuration imparted to the flat-rolled product as it leaves the coating bath. By the momentary presentation of the strip surface in planar condition at this point, opportunity is afforded to remove coating effectively from one surface of the strip without disturbing the coating on the opposite surface.

FIGURES 1 and 2 show schematically a portion of a continuous galvanizing line which includes a lead-in chute 5, galvanizing pot 6, and sink roll 7. The pot contains molten coating metal, in the case of zinc at a temperature of about 875° F. Continuous strip 8 is led through the lead-in chute 5, around the sink roll 7, through exit means indicated generally at 9, and coating removal means indicated generally at 12. In the specific embodiment of the invention illustrated, exit means 9 take the form of coating rolls 10 and 11, though the invention is in no way limited to coating roll exit means. Conventionally, coating rolls function to impart a controlled uniform coating on opposite surfaces of strip. In the invention, an important function to be served by coating rolls 10 and 11 or other exit means is delivery of the strip 8 in a planar form. It is obvious that, without departing from the spirit of the invention, coating rolls 10 and 11 can also serve their normal function of coating control; and also obvious, other means could be substituted for coating rolls 10 and 11 to perform their important function of imparting a planar configuration to the strip 8.

Referring to FIGURES 1 and 3, scraper 13 is a rigid blade having a rectilinear edge or scraping surface. Wiper 14 is a semirigid or pliable member of nonflammable material such as asbestos. Wiper 14 is supported on scraper 13 by wiper bracket 14' and is held in a wiper housing 15 which is adjustably mounted on scraper 13. Scraper 13 is affixed to scraper support arms 16 which are rigidly supported by support structure designated generally at 17.

In the operation of the apparatus thus far described, as strip 8 leaves the coating rolls 10 and 11, it has a uniform coating on both surfaces, the scraper 13 removes substantially all or a controlled portion of the molten coating on the surface contacted. Beyond scraper 13, wiper 14 contacts the strip, the action of the wiper is to smooth the remaining coating, if any, on the surface. The action of the support structure 17 is to hold the scraper 13 and wiper 14 in contact with the moving strip 8. Because of the contact pressure and angle of attack between the scraper 13 and the strip 8, and the speed of the line, there is a tendency for the scraper 13 to be thrown out of contact with the strip 8. The support structure 17 must be strong enough to overcome this tendency and to maintain the scraper 13 in contact with the strip at a point immediately beyond and as close as practicable to the nip of the coating rolls 10 and 11. In some cases the lower flat surface of the scraper can rest on coating roll 10.

In continuous line operations coating removal control must remain consistent over long periods of time during which the speed of the strip may vary over a wide scale. Any limitation on effectiveness due to varying speeds of the line would be especially detrimental in continuous operations. Adjustment control structure which will effect consistent coating removal is described in the following paragraph:

Referring to FIGURES 1 through 3, the scraper support bar 18 spans the strip 8 and is supported by millframe journals 19; these two members may be pivotally connected or the mill-frame journals 19 may be pivotally mounted on the mill-frame structures 20, either of which pivotal connections provide the necessary adjustment to change the angle of attack between the coating removal means 12 and the strip 8 and to partially control the contact pressure. The scraper support bar is fixed in desired position after adjustment by set screws 20'. The positioning of the coating removal means 12 relative to the nip of rolls 10 and 11 and also further control of the pressure of the scraper 13 on the strip 8 are made possible by the scraper contact control means 21, which in the illustrated embodiment comprises a threaded end section on each arm 16 and a pair of adjusting nuts 21' for anchoring each arm 16 at the desired length on scraper support bar 18. Scraper contact control means 21 thus permits axial movement of each support arm 16 and also locks each support arm 16 in position when the necessary adjustment has been made. The wiper housing 15 is separately adjustable relative to bracket 14' via set screws 22 in the wiper bracket 14', and wear adjustment screws 23 move the wiper 14 by threaded engagement with housing 15. With the adjustment control structure just described, continuous line operations have been conducted with the speed of the line varying to upwards of 200 feet per minute; coating removal has remained consistent throughout the operational range.

In the production of differential coat flat-rolled products it is desirable to have the angle between the scraping means 12 and the product 8 an acute angle. When rolls of sheet metal are successively welded together, scraper 13 tends to catch on the overlay of the weld. To eliminate tearing at the weld, the advancing edge overlay is made on the side of the strip which is not contacted for coating removal after exit from the coating rolls 10 and 11.

An additional feature of the invention, illustrated diagrammatically in FIGURE 4, prevents the build-up of a "beading" of molten metal by the action of the scraper on the edges and coated surface of the strip which may occur under certain circumstances. To accomplish this end, compressed air supply means 30 supplies compressed air to manifold 31 and conduits 32 and 33. As coating is being removed from one surface of the strip, nozzles 34 and 35 direct the compressed air against the edge of the strip of the side opposite the coating removal means 12. The compressed air prevents any build-up of coating at the edge regions of the strip.

It is understood that means may also be employed for removing excess coating metal on edge portions of the strip after such coating has solidified. For example, trimming knives disposed at an angle to the strip can be employed to remove excess coating metal from the edges of the strip and circular trimming knives, operative in a plane parallel to that of the strip, can be used to remove excess coating from the edge portions of the heavy coated side of the strip.

Turning now to the product produced by the methods and apparatus just described, it has been found that the differential coat product has unique and useful characteristics not previously contemplated. Wiper 14 acts to smooth, brush and spread any coating remaining on the strip 8 after passing the scraper 13. This wiping action leaves an attractive brushed pattern on the strip. Further it produces a dull coat or matte finish which has excellent paint adherence and bonderizing qualities. The effect of the wiping action can be modified by changing the type of wiper 14 or its contact pressure, by imparting lateral motion to the wiper during contact, or by special treatment of the strip as by grit rolling before coating.

In applications involving welding of the product, the differential coat flat-rolled product is far superior to common galvanized product. Previous to the production of differential galvanized products, the welding of galvanized material presented numerous problems which seriously limited its use. Using differential galvanized product, the welding operation is conducted at the surface from which the coating has been removed; the build-up of zinc coating at the welding area and on the welding apparatus, and other problems associated with welding galvanized products, are substantially reduced or eliminated.

Increased coating removal and better appearance are available by utilization of the methods and apparatus illustrated in FIGURES 5 and 6. When there is contact between a metal scraping means and an adjacent exit roll, such as the contact shown between scraper blade 13 and coating roll 10 in FIGURE 3, coating metal tends to accumulate below the scraper blade 13 in the confined area between scraper blade 13, coating roll 10, and strip 8. The molten coating metal removed from the strip can, to a large extent, escape only around the edges of the strip. It has been discovered that accumulating coating metal tends to chill and thicken. When in this condition "chunks" of metal can slip under the scraper and are redeposited on the strip causing an uneven finish and appearance. Also metal "chunks" damage the asbestos wiper 14 and shorten its life. In the present invention these shortcomings are eliminated entirely by the addition of heat at the proper place and by providing for rapid disposal of removed coating.

Referring to FIGURES 5 and 6, continuous strip 8 is lead into galvanizing pot 6 around sinker roll 7 and travels upwardly through coating rolls. In place of a conventionally grooved coating control roll a smooth roll 40 (without grooves) is preferably utilized on a side from which coating is to be removed. A smooth roll lessens the coating applied to that side and can be used within the teachings of the invention whereas ordinarily it would create objectionable "teardrop" markings on the coating. Coating removal means, designated generally 42, are supported by stands 44 and arms 45 which extend over roll 40. Coating removal means 42 include a metal scraper 46 and wiper 47 in contact with moving strip 8. Scraper 46 extends as far into the nip of the rolls as possible but is supported without contacting roll 40.

Flame pipe 50 is mounted above roll 40 and below scraper 46 so as to direct flame therebetween and against scraper 46. Flame pipe 50 is supplied from a suitable source (not shown) with either natural gas, coke oven gas, blast furnace gas or similar combustible; it includes a series of nozzles along its longitudinal length for directing gas against the removed coating metal along the entire width of strip 8. The primary purpose of the flame is to heat scraper 46 and the metal removed from strip 8; roll 40, because of its proximity, is also heated. Due to the added heat at this point the coating left on the strip after the scraping step is softer and as a result wiper 47 performs its function more efficiently.

The heat from flame pipe 50 causes the removed coating metal to flow more readily and the space left between roll 40 and scraper blade 46 permits its escape over the top of roll 40. Due to the heating of scraper 46 and its effect on wiper 47 the amount of coating that can be removed from strip 8 is increased. Differentially coated strip 52 after passing coating removal means 42 will have an extremely thin coating on one side. This thin coating can be as low as 0.02 or 0.03 oz./ft.$^2$; an average maximum coating weight of about 0.07 oz./ft.$^2$ is desirable and this and much lower weights are readily obtained with this combination. Coating weight on the surface which is not scraped and wiped will depend upon specifications but generally averages about 0.50 oz./ft.$^2$ for "commercial" differentially galvanized steel strip.

It is understood that electrical or other means for heating scraper 46 and the coating metal removed from the strip may also be employed, for example electrical induction heating or radiant heating.

The differentially coated strip of the present invention is further improved by minimizing the spangle formation in the coating remaining on the strip, especially the heavy coating surface. Minimizing spangle formation can be accomplished by contacting the molten galvanize coating with wet steam before spangle formation has started to appear. This process as applied to conventional galvanized product is described in detail in applicant's copending application Serial Number 26,301, entitled, "Metal Coating Process and Apparatus," filed on May 2, 1960 and issued on September 8, 1964, as Patent No. 3,148,080. However, briefly, wet steam at the proper temperature and pressure from a source (not shown) is delivered by steam lines 54 and 55 located on opposite surfaces of strip 52. A plurality of steam jets 56 direct the steam upwardly against the strip across its full width. The drawings show blowing wet steam on both surfaces of strip 52, however it is also possible to minimize spangle formation on the heavy coated side by blowing wet steam at the proper temperature and pressure against the heavy coated surface only.

Minimizing spangle formation solves a special problem associated with differentially galvanized product in addition to producing improved coating appearance and adhesion. Differentially galvanized product is often used for products requiring extensive forming, for example: automobile body parts. Such products are frequently temper rolled to develop desired mechanical properties. During such temper rolling or forming operations the large crystalline pattern of the spangled heavy coated side will often be impressed on the light galvanized coating surface. Minimizing spangle formation eliminates this problem entirely. Its contribution is twofold in this regard: one, it eliminates the large crystalline spangled pattern on the heavy coated side; two, it imparts a surface hardness to the galvanized coating. Such contributions play an important role in turning out the improved product resulting from practice of the invention.

Also included in the invention are flat-rolled products which are coating-free on one surface and methods and apparatus for producing such products. Molten coating is first removed by scraping then the light solidified coating remaining on one surface is removed entirely. For example, referring in particular to FIGURES 5, 7 and 8, differentially galvanized product 52 from which molten coating has been physically removed travels upwardly through a cooling tower (not shown). The strip then travels downwardly around guide roll 57 and into means for removing all coating from the light coated surface. Alternate means for removing all coating are shown in FIGURES 7 and 8.

Referring to FIGURE 7, bath apparatus 60 includes a trough 61 containing solution 62, bath rolls 64, and backup rolls 65. Bath rolls 64 are readily removable for purposes which will be described later. These rolls are partially submerged in solution 62 and only the light coated surface of a differentially galvanized product is contacted with solution. The surfaces of bath rolls 64 have a matte or scored surface to carry solution 62 into contact with the product. Backup rolls 65 insure intimate contact between the solution and the product without squeezing solution off the product entirely.

Solution 62 may be acid or basic depending on the coating metal being removed, both will work satisfactorily with aluminum for example.

Hydrochloric, sulfuric, nitric, and other acids are satisfactory for use with galvanize coating. Hydrochloric acid is especially satisfactory; no heat is required and zinc chloride may be recovered. The reaction follows the well known formula:

$$Zn + 2HCl \rightarrow ZnCl_2 + H_2$$

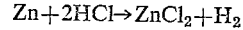

If any portion of coating remaining on a light coated side is alloyed with the base metal this alloy may also be removed. The acid reacts with the zinc as set forth above and reacts with the iron portion of the alloy in accordance with the following formula:

$$Fe + 2HCl \rightarrow FeCl_2 + H_2$$

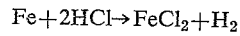

so that a coating-free steel surface can be produced.

In practice a hydrochloric solution with a 5 to 7% by volume concentration has been found to be satisfactory. With this solution, the time required to remove the light coating after scraping and wiping is approximately 25 to 30 seconds. With a continuous strip steel line operating at 65 f.p.m., the normal speed for differentially galvanizing product, approximately 30 feet of contact with the strip is required. Running a line at approximately 100 f.p.m. would require approximately 45 feet of contact. The longitudinal length of trough 61 will be dependent upon the maximum speed of the line. Bath rolls 64 are readily inserted or removed from the trough to facilitate adjustments of the time of contact with the acid solution. As an alternate to changing the number of bath rolls employed with changing line speeds, the concentration of the acid solution may be varied, the acid concentration increasing with increasing line speeds. The time of contact by either method can be shortened while permitting coating removal to be complete without objectionable attack on the steel by the acid.

In accordance with the present invention the light solidified coating remaining on one surface of strip 52 after scraping molten coating from the surface may also be removed by planishing. Referring to FIGURE 8, strip 52 from the cooling tower travels downwardly around guide roll 57 into planishing apparatus indicated generally at 70. Planishing apparatus 70 includes a plurality of stations each including a planishing roll 72. Planishing rolls 72 are power driven through linkage 75 by drive motor 76. The drive and/or linkage arrangement should permit individual control of the speed of rotation of the planishing rolls 72. Planishing rolls 72 are mounted to permit movement toward and away from the strip being treated and to permit individual control of the pressure of each planishing roll 72 against the strip. Back up rolls 80 are provided opposite each planishing roll and are mounted for rotational motion and movement toward and away from the strip.

Planishing rolls 72 generally take the form of heavy plastic covered metal wire brush rolls with the wire completely imbedded in the plastic except on the peripheral work surface of the roll. The weight and coarseness of such wire may vary at each station. Other variables include the pressure of the planishing rolls against the strip and the speed of rotation of these rolls at each station. Planishing mills such as that shown schematically in FIGURE 8 can be operated as part of a continuous strip line. At least five individual stations should be available on a line to permit the number of stations employed to vary with the speed of the line so that a smooth, coating-free surface can be obtained without changing the desired speed of the line as determined by the coating or other operation.

Many modifications and variations of the invention are made possible in the light of the above teachings. Therefore it is to be understood that, within the scope of the appended claims, the invention may be practiced otherwise than as specifically described.

What is claimed is:

1. Apparatus for producing differentially galvanized steel strip comprising
    continuous strip hot-dip galvanizing means including a molten galvanizing bath and coating roll means for delivering strip substantially vertically from the galvanizing bath in planar form,
    coating removal means for removing molten coating from only one surface of the strip as delivered from the galvanizing bath, such coating removal means including a rigid scraper contacting the strip across the entire width of the strip to remove molten coating and a wiper means located thereabove for wiping the surface from which coating has been removed by the scraper,
    support structure for adjustably positioning the coating removal means to contact the strip while in planar form and to define an opening bounded by the rigid scraper, the strip, and the coating roll means, and means for directing a flame into the opening.

2. The apparatus of claim 1 further including means for minimizing spangle formation in coating remaining after contact with the coating removal means.

3. Apparatus for producing differentially coated steel strip comprising
    coating means including a hot dip coating bath,
    coating control means for delivering the strip substantially vertically from the coating bath in planar form with uniform controlled coating weight on both surfaces of the strip,
    coating removal means located to contact only one surface of the strip while in planar form as delivered from the coating bath to remove molten coating from that surface of the strip, the coating removal means including a rigid member affixed to support structure so as to mechanically contact the one surface of the strip over its entire width at a point as close to the coating control means as practicable, and
    adjustably mounted support structure for the coating removal means arranged to maintain contact between the coating removal means and the one surface of the strip.

4. The apparatus of claim 3 in which the coating removal means further includes a pliable wiper means mechanically contacting the one surface of the strip from which coating has been removed by the rigid member.

5. Continuous-strip hot-dip galvanizing apparatus for producing differentially galvanized steel strip comprising
    hot-dip galvanizing means including a molten galvanizing bath,
    coating control means located in the molten galvanizing bath for delivering the strip substantially vertically from the bath with a molten galvanized coating of uniform controlled coating weight on both surfaces and with the strip in a substantially rectilinear configuration,
    scraping means having a rectilinear scraping surface for mechanically contacting only one surface of the strip as delivered from the molten galvanizing bath to remove molten coating from that surface, and
    support structure for the scraping means.

6. The apparatus of claim 5 further including means acting on edge regions of the strip after contact with the scraping means to remove any build-up of coating metal on edge regions of the remaining surface of the strip caused by scraping the one surface.

7. Process for producing differentially coated steel strip which comprises
    coating both surfaces of the strip in a hot-dip coating operation,
    controlling molten coating weight on both surfaces of the strip,
    delivering the strip substantially vertically from the coating operation with a uniform controlled coating weight on both surfaces and with the strip in substantially planar form, and
    contacting one surface only of the strip with metallic scraper means while the strip is in the planar form as delivered from the coating operation and while the coating is molten, the force of contact removing substantially all molten coating from that surface without changing the controlled coating weight on the remaining surface of the strip.

8. Continuous-strip process for producing differentially galvanized steel strip comprising
    continuously galvanizing steel strip in a hot-dip galvanizing bath,
    controlling coating weight to produce a uniform molten galvanized coating on both surfaces of the strip,
    delivering the hot-dip galvanized product substantially vertically from the hot-dip galvanizing bath in planar form with a uniform controlled coating weight on both surfaces, and
    contacting one surface only of the hot-dip galvanized product as delivered from the bath with a metallic scraper means to remove molten galvanize coating from that surface without changing the controlled galvanized coating weight on the remaining surface of the strip.

9. The process of claim 8 further including the step of contacting the surface from which coating has been removed with a pliable wiping member to smooth any remaining molten coating on that surface.

10. The process of claim 8 further including the step of removing coating metal build-up on edge regions of the strip caused by scraping coating metal from the one surface.

11. Continuous-strip method for producing differentially galvanized steel strip comprising
    galvanizing steel strip in a hot-dip galvanizing bath,
    controlling delivery of strip from the galvanizing bath and controlling coating weight on the strip while delivering the strip substantially vertically from the bath in planar form with a uniform relatively heavy coating weight on both surfaces of the strip,
    removing molten galvanized coating from one surface only of the strip by contacting the strip upon delivery from the galvanizing bath while in planar form with ridged scraper means, and
    directing a flame against the scraper means and molten galvanized coating removed from the strip.

12. The method for producing differentially galvanized steel strip of claim 11 further including the step of
chemically removing all remaining coating metal from the surface of the strip from which molten galvanized coating metal has been scraped by contacting only that surface with a chemical coating removal solution.

13. The method of producing differentially galvanized steel strip of claim 11 further including the step of
mechanically planishing the one surface from which molten galvanized coating metal has been scraped to remove all remaining coating metal from that surface.

14. Method for producing differentially galvanized steel strip in a hot-dip galvanizing bath comprising
galvanizing steel strip in a hot-dip galvanizing bath,
delivering the strip from the galvanizing bath in planar form,
removing molten galvanized coating from only one surface of the strip by contacting the steel strip with a rigid scraper while in planar form,
directing a flame against the scraper and molten galvanize coating removed from the strip,
wiping any molten metal remaining on the one surface after scraping, and
then minimizing spangle formation in remaining galvanize coating.

15. Continuous-strip hot-dip differentially galvanized steel strip having a uniform relatively heavy galvanized coating on one surface and a uniform substantially lighter coating on the remaining surface, the substantially lighter galvanized coating having a smooth wiped matte finish.

16. Continuous-strip hot-dip differentially galvanized steel strip having a uniform coating of relatively heavy weight on one surface and a substantially lighter uniform galvanized coating on the remaining surface averaging not more than about .07 ounce per square foot of strip.

References Cited by the Examiner

UNITED STATES PATENTS

| | | | |
|---|---|---|---|
| 84,205 | 11/1868 | Mills | 117—114 |
| 157,687 | 12/1874 | Johns | 118—103 X |
| 590,965 | 10/1897 | Cook | 118—419 |
| 794,169 | 7/1905 | Fellows | 117—102 |
| 911,613 | 2/1909 | Roberts | 118—419 |
| 1,980,961 | 11/1934 | Sommer | 118—102 X |
| 2,034,348 | 3/1936 | Lytle | 117—114 |
| 2,069,658 | 2/1937 | Renkin | 117—114 X |
| 2,126,244 | 8/1938 | Cook | 29—196.5 |
| 2,160,864 | 6/1939 | Hill et al. | 117—64 |
| 2,398,034 | 4/1946 | Oganowski | 117—102 |
| 2,708,171 | 5/1955 | Inglefield | 117—114 X |
| 2,888,901 | 6/1959 | Nieman et al. | 118—103 |
| 2,894,850 | 7/1959 | Greene et al. | 117—5.5 |
| 2,970,065 | 1/1961 | Green | 117—114 |
| 2,992,941 | 7/1961 | Whitley et al. | 117—114 |
| 2,993,804 | 7/1961 | Yonezaki et al. | 117—114 |
| 3,000,755 | 9/1961 | Hanink | 117—114 |
| 3,112,213 | 11/1963 | Lusa | 117—102 X |

FOREIGN PATENTS 19,653  1889  Great Britain.

OTHER REFERENCES

Bonton et al.: abstract of application Serial No. 790,646, published Dec. 19, 1950.

RICHARD D. NEVIUS, *Primary Examiner.*

R. S. KENDALL, *Assistant Examiner.*